(12) United States Patent
Wu

(10) Patent No.: US 11,132,524 B2
(45) Date of Patent: Sep. 28, 2021

(54) METHOD FOR COLLECTING FINGERPRINTS AND RELATED PRODUCTS

(71) Applicant: GUANGDONG OPPO MOBILE TELECOMMUNICATIONS CORP., LTD., Guangdong (CN)

(72) Inventor: Anping Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/875,461

(22) Filed: May 15, 2020

(65) Prior Publication Data

US 2020/0410193 A1 Dec. 31, 2020

(30) Foreign Application Priority Data

Jun. 29, 2019 (CN) .......................... 201910582514.5

(51) Int. Cl.
*G01N 29/07* (2006.01)
*G06K 9/00* (2006.01)
(Continued)

(52) U.S. Cl.
CPC ........... *G06K 9/0002* (2013.01); *G01N 29/07* (2013.01); *G06F 1/324* (2013.01); *G06F 1/3231* (2013.01);
(Continued)

(58) Field of Classification Search
CPC .. G06K 9/0002; G06K 9/00087; G06K 9/002; G06F 3/0416
See application file for complete search history.

(56) References Cited

U.S. PATENT DOCUMENTS

2015/0293592 A1 10/2015 Cheong et al.
2017/0330012 A1 11/2017 Salvia et al.
(Continued)

FOREIGN PATENT DOCUMENTS

CN 105184228 A 12/2015
CN 105488499 A 4/2016
(Continued)

OTHER PUBLICATIONS

EESR issued in corresponding European application No. 20174785.4 dated Oct. 9, 2020.
(Continued)

*Primary Examiner* — Abdul-Samad A Adediran
(74) *Attorney, Agent, or Firm* — Hodgson Russ LLP

(57) ABSTRACT

A method for collecting fingerprints and related products is provided. The method is applicable to an electronic device and includes the following. A first component set of the ultrasonic module is controlled to operate at a first operating frequency to capture a 3D image of a target object, where the first component set includes P transmitters and Q receivers, and P and Q are positive integers. A second component set of the ultrasonic module is woken up when the 3D image is identified to be a finger, where the second component set comprises M transmitters and N receivers, M and N are positive integers, P<M, and Q<N. The second component set of the ultrasonic module is controlled to collect fingerprints at a second operating frequency to obtain a target fingerprint image, where the first operating frequency is lower than the second operating frequency.

20 Claims, 5 Drawing Sheets

(51) Int. Cl.
*G06F 1/3231* (2019.01)
*G06F 1/324* (2019.01)
*G06F 3/041* (2006.01)

(52) U.S. Cl.
CPC ....... *G06F 3/0416* (2013.01); *G06K 9/00087* (2013.01)

(56) References Cited

U.S. PATENT DOCUMENTS

| | | | |
|---|---|---|---|
| 2019/0138705 A1 | 5/2019 | Kim et al. | |
| 2020/0167538 A1* | 5/2020 | Lu | G06K 9/0002 |
| 2021/0003534 A1* | 1/2021 | Lal | G06F 3/0416 |

FOREIGN PATENT DOCUMENTS

| CN | 106896955 | | 6/2017 |
|---|---|---|---|
| CN | 106919914 | A | 7/2017 |
| CN | 106940589 | | 7/2017 |
| CN | 107111335 | A | 8/2017 |
| CN | 107273826 | A | 10/2017 |
| CN | 107463900 | | 12/2017 |
| CN | 108496181 | A | 9/2018 |
| CN | 109196520 | A | 1/2019 |
| CN | 109219787 | A | 1/2019 |
| CN | 109219817 | A | 1/2019 |
| CN | 109491552 | A | 3/2019 |
| CN | 109597477 | A | 4/2019 |
| CN | 110286738 | A | 9/2019 |

OTHER PUBLICATIONS

OA2 issued in corresponding CN application No. 201910582514.5 dated Nov. 11, 2020.
SIPO, First Office Action in CN App. No. 201910582514.5, dated Jul. 1, 2020, 22 pages (including translation).
ISA/CN, International search report issued in PCT App. No. PCT/CN2020/096189, dated Sep. 21, 2020, 4 pages.
SIPO, Notification to Grant Patent Right for Invention for CN Application No. 201910582514.5, dated Mar. 29, 2021.
IPI, Office Action for IN Application No. 202014025713, dated Jul. 29, 2021.

* cited by examiner

METHOD FOR COLLECTING FINGERPRINTS AND RELATED PRODUCTS

CROSS-REFERENCE TO RELATED APPLICATIONS

This application claims priority to Chinese Patent Application No. 2019105825145, filed on Jun. 29, 2019, the disclosure of which is hereby incorporated by reference in its entirety.

TECHNICAL FIELD

This disclosure relates to the technical field of electronic devices, and particularly to a method for collecting fingerprints and related products.

BACKGROUND

With wide popularity of electronic devices (for example, mobile phones, tablet computers, etc.), the electronic device can support an increasing number of applications and is becoming more powerful. The electronic device is also becoming diversified and personalized and has become an indispensable part of users' lives.

Fingerprint collection technology has also become an essential technology for the electronic device. With the development of the fingerprint collection technology, ultrasonic modules have become more and more popular with manufacturers. However, a large-area ultrasonic module (for example, a full-screen ultrasonic module) is easy to be touched by mistake, which increases the power consumption of the electronic device. Therefore, how to reduce the power consumption of the ultrasonic module has become a problem to be solved.

SUMMARY

Implementations provide a method for collecting fingerprints and related products.

According to a first aspect, a method for collecting fingerprints is provided. The method may be applicable to an electronic device with an ultrasonic module and the method may include the following. A first component set of the ultrasonic module is controlled to operate at a first operating frequency to capture a 3D image of a target object, where the first component set includes P transmitters and Q receivers, and P and Q are positive integers. A second component set of the ultrasonic module is woken up when the 3D image is identified to be a finger, where the second component set includes M transmitters and N receivers, M and N are positive integers, P<M, and Q<N. The second component set of the ultrasonic module is controlled to collect fingerprints at a second operating frequency to obtain a target fingerprint image, where the first operating frequency is lower than the second operating frequency.

According to a second aspect, an electronic device is provided. The electronic device may include at least one processor, an ultrasonic module, and a non-transitory computer readable storage. The computer readable storage may be coupled to the at least one processor and store at least one computer executable instruction thereon which, when executed by the at least one processor, causes the at least one processor to execute the method of the first aspect.

According to a third aspect, a non-transitory computer readable storage medium is provided. The computer readable storage medium may be configured to store computer programs for electronic data interchange. The computer programs, when executed by a computer, may be operable with the computer to execute all or part of the operations described in the first aspect.

BRIEF DESCRIPTION OF THE DRAWINGS

To describe technical solutions in embodiments of the present disclosure more clearly, the following briefly introduces accompanying drawings required for illustrating the embodiments of the present disclosure. Apparently, the accompanying drawings in the following description illustrate some embodiments of the present disclosure. Those of ordinary skill in the art may also obtain other drawings based on these accompanying drawings without creative efforts.

DETAILED DESCRIPTION

In order for those skilled in the art to better understand technical solutions of the present disclosure, in the following, technical solutions of embodiments of the present disclosure will be described clearly and completely with reference to accompanying drawings. Apparently, embodiments described hereinafter are merely some rather than all embodiments of the present disclosure. All other embodiments obtained by those of ordinary skilled in the art based on embodiments without creative efforts shall fall within the protection scope.

The terms "first", "second", and the like used in the specification, the claims, and the accompany drawings are used to distinguish different objects rather than describe a particular order. In addition, the terms "include", "comprise", and "have" as well as variations thereof are intended for non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or apparatus can also be included.

The term "embodiment" referred to herein means that a particular feature, structure, or character described in conjunction with the embodiment may be contained in at least one embodiment. The phrase appearing in various places in the specification does not necessarily refer to the same embodiment, nor does it refer to an independent or alternative embodiment that is mutually exclusive with other embodiments. It is explicitly and implicitly understood by those skilled in the art that an embodiment described herein may be combined with other embodiments.

An electronic device in embodiments of the present disclosure may include various handheld devices, in-vehicle devices, wearable devices (for example, smart watches, smart bracelets, wireless headsets, augmented-reality/virtual-reality devices, smart glasses), computing devices that have wireless communication functions or other processing devices connected to the wireless modem, as well as various forms of user equipment (UE), mobile stations (MS), terminal devices, and the like. For the convenience of description, the above-mentioned devices are collectively referred to as the electronic device.

Hereinafter, embodiments of the present disclosure will be described in detail.

Figure 1A:
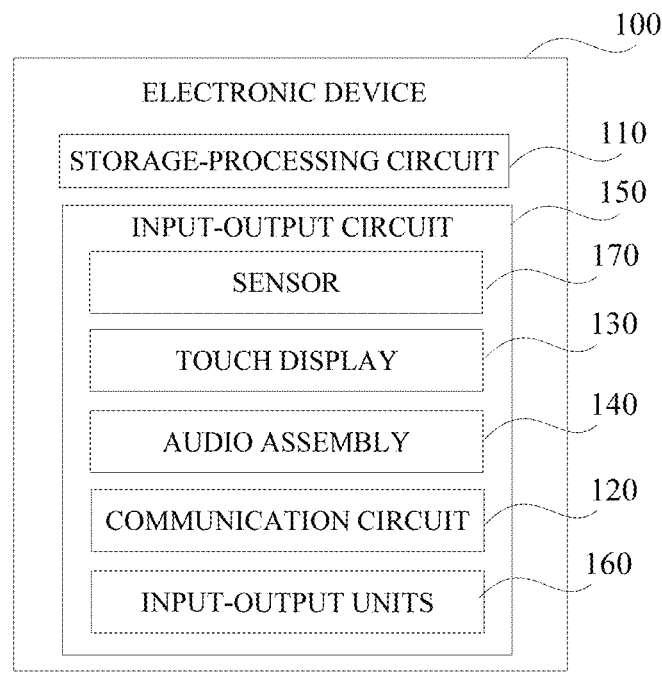
FIG. 1A is a schematic structural diagram illustrating an electronic device according to an embodiment of the present disclosure.

FIG. 1A is a schematic structural diagram illustrating an electronic device according to an embodiment of the present disclosure. As illustrated in FIG. 1A, an electronic device 100 includes a storage-processing circuit 110 and a sensor 170 coupled with the storage-processing circuit 110.

The electronic device 100 can include a control circuit. The control circuit can include the storage-processing circuit 110. The storage-processing circuit 110 may be a memory, such as a hard drive memory, a non-transitory memory (such as a flash memory, other electronically programmable read-only memories used to form a solid-state drive, or the like), a transitory memory (such as a static random access memory, dynamic random access memory, or the like), or the like, which is not limited herein. The storage-processing circuit 110 has a processing circuit to control operations of the electronic device 100. The processing circuit can be implemented based on one or more microprocessors, microcontrollers, digital signal processors, baseband processors, power management units, audio codec chips, application-specific integrated circuits, display driver integrated circuits, or the like.

The storage-processing circuit 110 can be configured to run software of the electronic device 100, such as an Internet browsing application, a voice over Internet protocol (VOIP) phone call application, an email application, a media playback application, an operating system function, and the like. The software may be used to perform some control operations, such as camera-based image collection, ambient light sensor-based ambient light measurements, proximity sensor-based proximity sensor measurements, information display function based on status indicators such as status indicator lamps of light-emitting diodes (LEDs), touch sensor-based touch event detection, functions associated with displaying information on multiple (e.g., layered) displays, operations associated with implementing wireless communication functions, operations associated with collecting and generating audio signals, control operations associated with collecting and processing data related to button-press event, and other functions of the electronic device 100, which is not limited herein.

The electronic device 100 can further include an input-output circuit 150. With the input-output circuit 150, data input and data output can be achieved in the electronic device 100, for example, the electronic device 100 can receive data from an external device and output data to an external device. The input-output circuit 150 can further include a sensor 170. The sensor 170 can include an ultrasonic module, an ambient light sensor, an optical or capacitive proximity sensor, a touch sensor (e.g., an optical touch sensor and/or a capacitive touch sensor, where the touch sensor may be a part of a touch display or may be used independently as a touch sensor structure), an acceleration sensor, a camera, and other sensors. The camera can be a front camera or a rear camera. The ultrasonic module can be integrated below a display screen, or set on the side or back of the electronic device, which is not limited herein. The ultrasonic module may be configured to collect (i.e., receive) fingerprint images. The ultrasonic module can have multiple transmitters and multiple receivers. The transmitters may be used to transmit ultrasonic signals and the receivers may be used to receive ultrasonic signals.

The input-output circuit 150 can further include one or more display devices, such as a display 130. The display 130 may include one or more of a liquid crystal display, an organic light emitting diode (OLED) display, an electronic ink display, a plasma display, and displays based on other display technologies. As an example, the display 130 may include an array of touch sensors (i.e., the display device 130 can be a touch display screen). The touch sensor may be a capacitive touch sensor formed by an array of transparent touch sensor electrodes (e.g., indium tin oxide (ITO) electrodes), or may be a touch sensor formed with other touch technologies, such as acoustic touch, pressure sensitive touch, resistance touch, optical touch, and the like, which is not limited herein.

The electronic device 100 can further include an audio assembly 140. The audio assembly 140 may be configured to provide the electronic device 100 with audio input and output functions. The audio assembly 140 of the electronic device 100 may include speakers, microphones, buzzers, tone generators, and other assemblies for generating and detecting sound.

A communication circuit 120 may be configured to provide the electronic device 100 with the ability to communicate with external devices. The communication circuit 120 may include analog/digital input-output interface circuits and wireless communication circuits based on radio frequency signals and/or optical signals. The wireless communication circuit of the communication circuit 120 may include a radio frequency transceiver circuit, a power amplifier circuit, a low-noise amplifier, a switch, a filter, and an antenna. As an example, the wireless communication circuit of the communication circuit 120 may include a circuit which supports near field communication (NFC) by transmitting and receiving near field coupled electromagnetic signals. Specifically, the communication circuit 120 may include an NFC antenna and an NFC transceiver. As another example, the communication circuit 120 may further include transceivers and antennas for a cellular telephone, transceiver circuits and antennas for a wireless local area network, and the like.

The electronic device 100 can further include a battery, a power management circuit, and other input-output units 160. The other input-output units 160 can include, but are not limited to, buttons, joysticks, click wheels, scroll wheels, touch pads, keypads, keyboards, cameras, LEDs, and other status indicators.

An instruction can be input by a user through the input-output circuit 150 to control operations of the electronic device 100, and state information and other outputs can be received from the electronic device 100 through the input-output circuit 150.

Figure 1B:
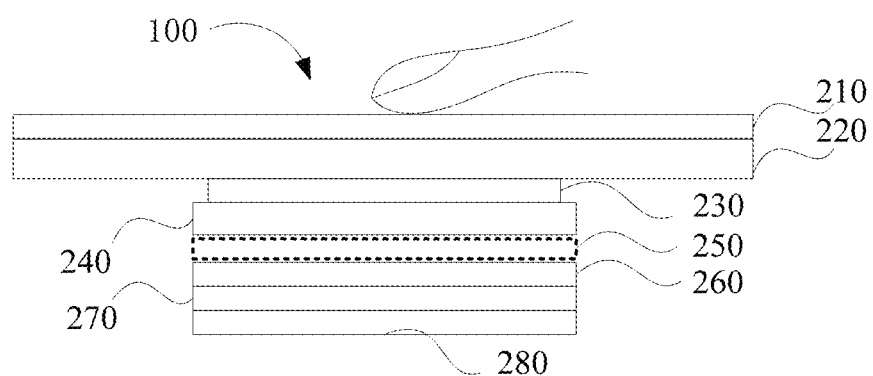
FIG. 1B is a schematic structural diagram illustrating an electronic device according to another embodiment of the present disclosure.

As an example, the ultrasonic module may be located below the display screen. FIG. 1B is a schematic structural diagram illustrating an electronic device. As illustrated in FIG. 1B, the electronic device 100 may include a cover glass 210, a display screen (e.g., OLED) 220, a adhesive layer 230, a substrate (e.g., thin film transistor (TFT) glass) 240, a pixel layer 250, a piezoelectric material (e.g., copolymer) layer 260, an Ag ink layer 270, a solidification-glue layer (e.g., die attach film (DAF)) 280. A film layer may also be provided above the glass cover, and the film layer may be a tempered film, which is used to protect the display screen of the electronic device.

Furthermore, the ultrasonic module may include the TFT glass layer, the pixel layer, the Ag ink layer, and the solidification-glue layer. The TFT glass layer may be used for metal wiring and material coating. The pixel layer may be used as a negative electrode for ultrasonic transmission/reception embedded in a metal electrode of the TFT Glass layer. The copolymer, also known as a piezoelectric transducer material, can implement interconversion of material deformation and voltage. The Ag ink layer may be used as a positive electrode for ultrasonic transmission/reception. The DAF layer may be made of solidification glue and may be used to protect the ultrasonic module. The adhesive layer may be made of adhesive and may be used to adhere the ultrasonic module to the OLED screen.

For example, the ultrasonic module can switch between two states, for example, between a transmit (TX) state (for transmitting ultrasonic signals) and a receive (RX) state (for receiving ultrasonic signals).

In the TX state, a high-frequency (e.g. at 10 MHz level) oscillator signal, such as sine waves, may be provided through electrodes (e.g. pixel-layer negative electrode and Ag ink-layer positive electrode) at both ends of the copolymer (e.g. piezoelectric material). The copolymer can generate vibration responding to the frequency and emit ultrasonic waves. The ultrasonic signal transmitted upward passes through the OLED screen and reaches fingerprints applied to the screen surface. When fingerprint valleys and fingerprint ridges are attached to the screen, the acoustic resistance characteristic of air in the fingerprint valleys is significantly different from the acoustic resistance characteristic of glass of the screen surface, and the acoustic resistance of skin tissue of the fingerprint ridges is significantly different from the acoustic resistance of the glass of the screen surface, therefore, the intensities of reflected signals of the fingerprint valleys and the fingerprint ridges to ultrasonic signals are different.

In the RX state, when the reflected ultrasonic signal passes through the display screen again and reaches the ultrasonic module (pixel layer-Copolymer-Ag ink layer), it causes vibration of the copolymer to generate an electrical signal. The vibration intensity of the copolymer in a pixel region corresponding to the fingerprint valleys and the fingerprint ridges at different positions are different. Therefore, potential differences received by pixels at different positions are different (e.g. the Ag ink layer is isopotential), the potential differences are converted into a two-dimensional (2D) image signal. In this way, an ultrasonic fingerprint image can be obtained.

The electronic device illustrated in FIG. 1A and FIG. 1B can be used to implement following functions.

The ultrasonic module may be configured to control a first component set of the ultrasonic module to operate at a first operating frequency to capture a 3D image of a target object, where the first component set includes P transmitters and Q receivers, and P and Q are positive integers.

The processing circuit may be configured to wake up a second component set of the ultrasonic module when the 3D image is identified to be a finger, where the second component set includes M transmitters and N receivers, M and N are positive integers, P<M, and Q<N.

The ultrasonic module may further be configured to control the second component set of the ultrasonic module to collect fingerprints at a second operating frequency to obtain a target fingerprint image, where the first operating frequency is lower than the second operating frequency.

In an embodiment of the present disclosure, the processing circuit may be further configured to control the ultrasonic module to enter a sleep mode when the target object is not detected.

In an embodiment of the present disclosure, the electronic device may further include a proximity detector. The proximity detector may be configured to detect a distance between the target object and the electronic device. When the distance is less than a predetermined distance, the ultrasonic module may be configured to control the first component set of the ultrasonic module to operate at the first operating frequency when the distance is less than a predetermined distance.

In an embodiment of the present disclosure, the ultrasonic module configured to control the first component set of the ultrasonic module to operate at the first operating frequency may be configured to: control the first component set of the ultrasonic module to operate at the first operating frequency according to a predetermined period, where the predetermined period includes at least one first period of time and least one second period of time. For example, the ultrasonic module may be configured to control, within any one of the at least one first period of time, the ultrasonic module to operate at a first transmission power and the first operating frequency, and control, within any one of the at least one second period of time, the ultrasonic module to operate at a second transmission power and the second operating frequency, where the first transmission power is less than the second transmission power.

In an embodiment of the present disclosure, the processing circuit that is configured to wake up the second component set of the ultrasonic module may be further configured to: determine a proximity position of a finger; determine, according to a correspondence between positions and component sets, the second component set corresponding to the proximity position, and wake up the second component set.

As can be seen, the electronic device of embodiments of the present disclosure can include the ultrasonic module. The first component set of the ultrasonic module may be controlled to operate at the first operating frequency to capture the 3D image of the target object, where the first component set includes P transmitters and Q receivers, and P and Q are positive integers. When the 3D image is identified to be a finger, the second component set of the ultrasonic module may be woken up, where the second component set includes M transmitters and N receivers, M and N are positive integers, P<M, and Q<N. The second component set of the ultrasonic module may be controlled to collect fingerprints at the second operating frequency to obtain the target fingerprint image, where the first operating frequency is lower than the second operating frequency. In this way, the ultrasonic module may only use a part of the components for proximity detection. When the ultrasonic module detects that the approaching target object is a finger, more components for fingerprint collection can be used. As such, the power consumption of the ultrasonic module can be reduced and the efficiency of fingerprint collection can be improved.

Figure 1C:
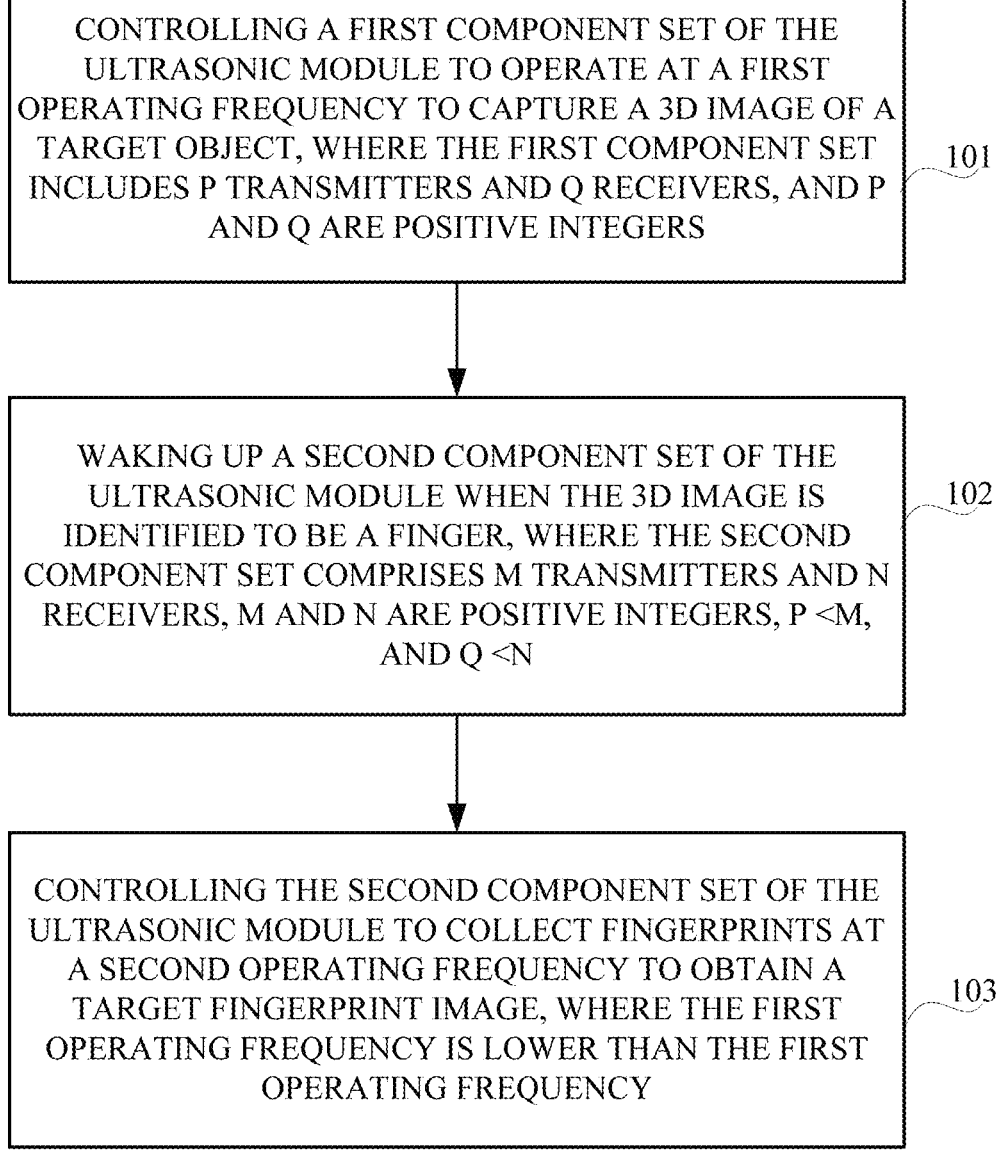
FIG. 1C is a schematic flow chart illustrating a method for collecting fingerprints according to an embodiment of the present disclosure.

FIG. 1C is a schematic flow chart illustrating a method for collecting fingerprints according to an embodiment of the present disclosure. As illustrated in FIG. 1C, the method may be applicable to an electronic device with an ultrasonic module and the method may include the following.

At step 101, a first component set of the ultrasonic module is controlled to operate at a first operating frequency to capture a 3D image of a target object, where the first component set includes P transmitters and Q receivers, and P and Q are positive integers.

In an embodiment of the present disclosure, the target object may be a finger or other object. The first operating frequency may be understood as the number of times of transmitting and receiving ultrasonic signals by the ultrasonic module within a unit of time. The ultrasonic module can include multiple transmitters and multiple receivers. The first component set can include P transmitters and Q receivers, where P and Q are positive integers. The first component set may include part of components of the ultrasonic module. For example, P transmitters and Q receivers can be widely distributed in different positions of the electronic device to perform proximity detection in different directions.

According to an embodiment of the present disclosure, the electronic device can control the first component set of the ultrasonic module to work at the first operating frequency while other components are in a sleep mode or in a non-working mode. The first component set can be used for proximity detection and collection of the 3D image of the target object. As an example, the 3D image of the target object can be acquired with the ultrasound module.

According to an embodiment of the present disclosure, operations of controlling the first component set of the ultrasonic module to operate at the first operating frequency at step 101 can be implemented as follows.

The first component set of the ultrasonic module is controlled to operate at the first operating frequency according to a predetermined period, where the predetermined period includes at least one first period of time and least one second period of time.

According to an embodiment of the present disclosure, the ultrasonic module is controlled to operate at a first transmission power and the first operating frequency within any one of the at least one first period of time, and operate at a second transmission power and the second operating frequency within any one of the at least one second period of time, where the first transmission power is less than the second transmission power.

The first transmission power may be understood as power consumed by transmitting a ultrasonic signal by the ultrasonic module. The predetermined period can be set by the user or defaulted by the system. The predetermined period and a period corresponding to the first operating frequency can be the same or different, which is not limited herein. The predetermined period can include at least one first period of time and least one second period of time. The electronic device can control the first component set of the ultrasonic module to operate at the first operating frequency according to the predetermined period. According to an embodiment of the present disclosure, the ultrasonic module can control the ultrasonic module to operate at the first transmission power and the first operating frequency within any one of the at least one first period of time, and control the ultrasonic module to operate at the second transmission power and the first operating frequency within any one of the at least one second period of time. In this way, the target object can be detected alternately (in other words, periodically), the power consumption of the device can be effectively reduced, and the target object can also be accurately detected.

According to an embodiment of the present disclosure, the method may further include the following. When the target object is not detected, the ultrasonic module may be controlled to enter a sleep mode.

When the electronic device does not detect the target object, the electronic device can control the ultrasonic module to enter the sleep mode, or if the ultrasonic module is originally in a partial sleep mode, the partial sleep mode of the ultrasonic module can be maintained, for example, only a small part of the component sets (for example, the first component set) may be used for proximity detection, and other components may be in a sleep mode.

According to an embodiment of the present disclosure, the method further includes the following before operations at step 101.

At step A1, a distance between the target object and the electronic device is detected though a proximity detector.

At step A2, the first component set of the ultrasonic module is controlled to operate at the first operating frequency when the distance is less than a predetermined distance.

The predetermined distance can be set by the user or defaulted by the system. The electronic device can be provided with a proximity sensor. The proximity sensor can be an infrared proximity sensor. The distance between the target object and the electronic device can be detected by the proximity sensor. When the distance is less than the predetermined distance, perform operations at step 101; otherwise, control the electronic control to be the sleep mode, or skip operations at step 101.

At step 102, a second component set of the ultrasonic module is woken up when the 3D image is identified to be a finger, where the second component set includes M transmitters and N receivers, M and N are positive integers, P<M, and Q<N.

When the 3D image is an image of a finger, the second component set of the ultrasonic module can be woken up. The second component set can include M transmitters and N receivers. The second component set can include all or part of transmitters and receivers of the ultrasonic module. There may or may not be an overlap between the first component set and the second component set.

According to an embodiment of the present disclosure, the method can further include the following between the above operations at step 101 and operations at step 102.

At step B1, perform image segmentation on the 3D image to obtain a target area image.

At step B2, perform contour extraction on the target area image to obtain a target contour.

At step B3, identify the target contour.

At step B4, when the target contour is a finger contour, determine that the target object is a finger.

The 3D image includes other backgrounds in addition to the image of the target object. Therefore, the electronic device can perform image segmentation on the 3D image to obtain the target area image, that is, only the image of the target object. Then the electronic device can perform contour extraction on the target area image, for example, the electronic device can perform Hough transform to extract the contour of the target area image, to obtain the target contour. The electronic device identifies the target contour, for example, the electronic device identifies the shape of the target contour or the average width of the target contour. When the target contour is a finger contour, determine that the target object is a finger.

According to an embodiment of the present disclosure, waking up the second component set of the ultrasonic module at step 102 can include the following.

At step 21, a proximity position of a finger is determined.

At step 22, the second component set corresponding to the proximity position is determined according to a correspondence between positions and component sets, and the second component set is woken up.

The proximity position of the finger can be determined though the proximity detector. The proximity position of the finger can be a position where the finger is applied to the screen surface of the electronic device. The electronic device can collect fingerprints without using all components of the ultrasonic module. Instead, the electronic device can determine the proximity position of the finger, and only use some components close to the proximity position for fingerprint collection. In this way, the power consumption of the device can be reduced. The correspondence between positions and component sets can be stored in the electronic device in advance, and after the proximity position of the finger is determined, the second component set corresponding to the proximity position can be determined according to the correspondence.

At step 103, the second component set of the ultrasonic module is controlled to collect fingerprints at a second operating frequency to obtain a target fingerprint image, where the first operating frequency is lower than the second operating frequency.

The second operating frequency is higher than the first operating frequency. In this way, fingerprint collection can be performed better. According to an embodiment of the present disclosure, the electronic device can control the second component set of the ultrasonic module to perform fingerprint collection at the second operating frequency to obtain the target fingerprint image.

According to an embodiment of the present disclosure, controlling the second component set of the ultrasonic module to collect fingerprints at the second operating frequency to obtain the target fingerprint image at step 103 can include the following.

At step 31, determine a proximity velocity at which the target object approaches the ultrasonic module and a current distance between the target object and the ultrasonic module.

At step 32, estimate fingerprint image acquisition time of the ultrasonic module according to the current distance and the proximity velocity.

At step 33, collect fingerprints through the second component set at the second operating frequency to obtain the target fingerprint image, when the fingerprint image acquisition time is reached.

According to an embodiment of the present disclosure, when the ultrasonic module detects that the fingerprint image acquisition time is reached, it uses more components (e.g. the second component set) for fingerprint collection. As such, the power consumption of the ultrasonic module can be reduced and the efficiency of fingerprint collection can be improved.

According to an embodiment of the present disclosure, the method further includes: adjusting a fingerprint image acquisition parameter of the ultrasonic module according to the proximity velocity to obtain an adjusted fingerprint image acquisition parameter. Fingerprints can be collected through the second component set at the second operating frequency to obtain the target fingerprint image as follows. Collect fingerprints through the second component set at the second operating frequency with the adjusted fingerprint image acquisition parameter to obtain the target fingerprint image.

According to an embodiment of the present disclosure, the fingerprint image acquisition parameter may be at least one of the following: transmit power of the ultrasonic module, an operating current of the ultrasonic module, an operating voltage of the ultrasonic module, and the like, which are not limited herein. The electronic device can determine the proximity velocity at which the target object approaches the ultrasonic module through an ultrasonic sensor. For example, the electronic device can transmit and receive ultrasonic at predetermined time intervals. The electronic device can detect a proximity distance of the target object in a unit time and the current distance between the target object and the ultrasound module, and obtain the proximity velocity according to the proximity distance. A predetermined time interval can be set by the user or defaulted by the system. Then, the fingerprint image acquisition time of the ultrasound module can be estimated by the current distance and the proximity velocity. The fingerprint image acquisition time is earlier than (e.g. <) current distance/proximity velocity. The fingerprint image acquisition time can be any time between 0 to current distance/proximity velocity (e.g. 0~current distance/proximity velocity). For example, the fingerprint image acquisition time can be a moment when the distance between the target object and the ultrasound module is equal to ½ of the current distance. Of course, different proximity velocities may lead to image shaking. Therefore, the fingerprint image acquisition parameter of the ultrasound module can be adjusted. A correspondence between velocities and adjustment parameters can be stored in the electronic device in advance, and the target adjustment parameter corresponding to the proximity velocity can be determined according to the correspondence. The adjustment parameter is a positive number. In this way, the adjusted fingerprint image acquisition parameter can be obtained. When the fingerprint image acquisition time is reached, collect fingerprints though the second component set of the ultrasound module at the second operating frequency with the adjusted fingerprint acquisition parameter to obtain the target fingerprint image. As such, a fingerprint image with better image quality can be obtained.

As an implementation, the method can further include the following after operations at step 103.

At step C1, match the target fingerprint image with a preset fingerprint template.

At step C2, when the target fingerprint image matches the preset fingerprint template, perform an unlock operation.

The electronic device can store the preset fingerprint template in advance, and further the electronic device can match the target fingerprint image with the preset fingerprint template. When the target fingerprint image matches the preset fingerprint template successfully, an unlock operation can be performed. The unlock operation may be at least one of the following: entering a main page from a lock screen or a black screen, launching a preset application from the lock screen or the black screen, or performing a preset operation. The preset operation may be at least one of the following: deleting, modifying, compressing, selecting, photographing, paying, etc. which is not limited herein.

According to an embodiment of the present disclosure, matching the target fingerprint image with the preset fingerprint template at C1 can include the following.

At step C11, perform image segmentation on the target fingerprint image to obtain a target fingerprint area image.

At step C12, analyze feature point distribution of the target fingerprint area image.

At step C13, perform circular image interception on the target fingerprint area image according to J different circle centers to obtain J circular fingerprint area images, where J is an integer greater than 3.

At step C14, select a target circular fingerprint area image from the J circular fingerprint area images, where the target circular fingerprint area image includes more feature points than other circular fingerprint area images in the J circular fingerprint area images.

At step C15, divide the target circular fingerprint area image into K rings, and the ring widths of the K rings are the same.

At step C16, starting from the ring with the smallest radius among the K rings, match feature points of the K rings with the preset fingerprint template in order, and accumulate a matching value of matched rings.

At step C17, when the accumulated matching value is greater than a predetermined matching threshold, stop feature point matching immediately and output a prompt message indicating a successful identification.

The predetermined matching threshold can be set by the user or defaulted by the system. The electronic device can perform image segmentation on the target fingerprint image to obtain the target fingerprint area image. Furthermore, the electronic device can analyze feature point distribution of the target fingerprint area image, and perform circular image interception on the target fingerprint area image according to the J different center points to obtain the J circular fingerprint area images, where J is an integer greater than 3. The electronic device selects the target circular fingerprint area image from the J circular fingerprint area images, where the target circular fingerprint area image includes more feature points than other circular fingerprint area images in J circular fingerprints the area images. The target circular fingerprint area image is divided into K rings, where the ring widths of the K rings are the same. Starting from the ring with the smallest radius among the K rings, match the feature points of the K rings with the preset fingerprint template in order, and accumulate the matching value of the matched rings. In this way, in a fingerprint recognition process, feature points of different positions or different fingerprints can be used for matching, that is, the entire fingerprint image is sampled, and sampling can cover a entire fingerprint area, so that corresponding up-to-standard characteristics used for matching can be found from each area. When the accumulated matching value is greater than the predetermined matching threshold, stop the feature point matching immediately, and output the prompt message indicative of a successful identification, so that the fingerprint can be identified quickly and accurately.

As can be seen, the method for collecting fingerprints according to embodiments of the present disclosure is applicable to the electronic device with the ultrasonic module. The first component set of the ultrasonic module is controlled to operate at the first operating frequency to capture the 3D image of the target object, where the first component set includes P transmitters and Q receivers, and P and Q are positive integers. The second component set of the ultrasonic module is woken up when the 3D image is identified to be a finger, where the second component set includes M transmitters and N receivers, M and N are positive integers, P<M, and Q<N. The second component set of the ultrasonic module is controlled to collect fingerprints at the second operating frequency to obtain the target fingerprint image, where the first operating frequency is lower than the second operating frequency. In this way, the ultrasonic module only uses part of the components for proximity detection. When the ultrasonic module detects that the approaching target object is a finger, it uses more components for fingerprint collection. As such, the power consumption of the ultrasonic module can be reduced and the efficiency of fingerprint collection can be improved.

Figure 2:
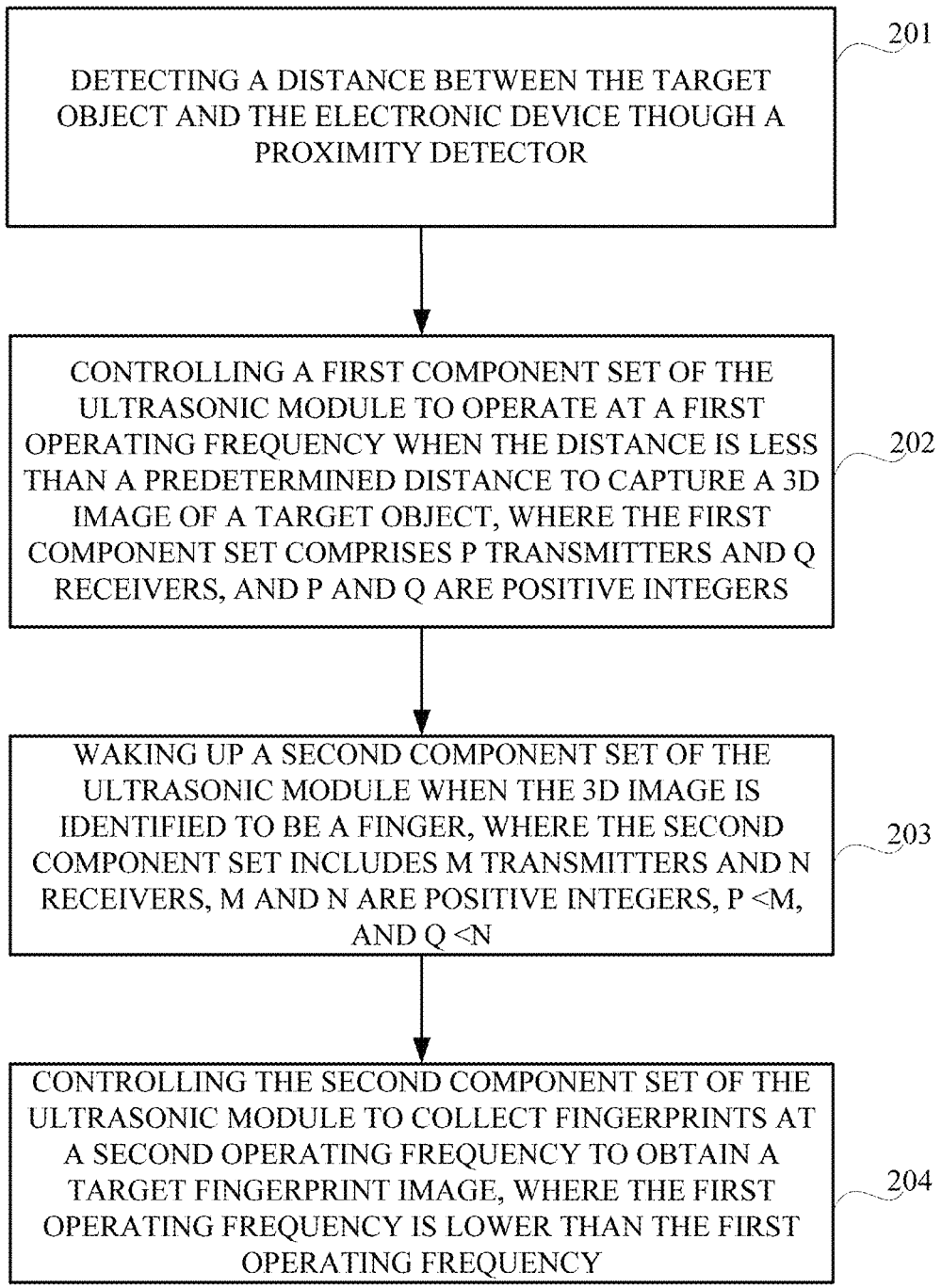
FIG. 2 is a schematic flow chart illustrating a method for collecting fingerprints according to another embodiment of the present disclosure.

In view of the embodiments of FIG. 1, reference can be made to FIG. 2. FIG. 2 is a schematic flow chart illustrating a method for collecting fingerprints according to another embodiment of the present disclosure. As illustrated in FIG. 2, the method for collecting fingerprints is applicable to the electronic device as illustrated in FIG. 1A. The electronic device has an ultrasonic module. The method for collecting fingerprints includes the following.

At step 201, detect a distance between the target object and the electronic device through a proximity sensor.

At step 202, when the distance is less than a predetermined distance, control a first component set of the ultrasonic module to operate at a first operating frequency to capture a 3D image of a target object, where the first component set includes P transmitters and Q receivers, and P and Q are positive integers.

At step 203, when the 3D image is identified to be a finger, wake up a second component set of the ultrasonic module, where the second component set includes M transmitters and N receivers, M and N are positive integers, P<M, and Q<N.

At step 204, control the second component set of the ultrasonic module to collect fingerprints at a second operating frequency to obtain a target fingerprint image, where the first operating frequency is lower than the second operating frequency.

For detailed descriptions of the operations at steps 201 to 204, reference can be made to corresponding operations of the method for collecting fingerprints described in FIG. 1C, which will not be repeated herein.

As can be seen, the method for collecting fingerprints according to embodiments of the present disclosure is applicable to the electronic device with the ultrasonic module. A distance between the target object and the electronic device is detected through the proximity sensor. When the distance is less than the predetermined distance, the first component set of the ultrasonic module is controlled to operate at the first operating frequency to capture the 3D image of the target object, where the first component set includes P transmitters and Q receivers, and P and Q are positive integers. When the 3D image is identified to be a finger, the second component set of the ultrasonic module is woken up, where the second component set includes M transmitters and N receivers, M and N are positive integers, P<M, and Q<N. The second component set of the ultrasonic module is controlled to collect fingerprints at the second operating frequency to obtain the target fingerprint image, where the first operating frequency is lower than the second operating frequency. In this way, the proximity sensor can perform proximity detection roughly, and then the ultrasonic module uses part of the components for proximity detection. When the ultrasonic module detects that the approaching target object is a finger, it uses more components for fingerprint collection. As such, the power consumption of the ultrasonic module can be reduced and the efficiency of fingerprint collection can be improved.

Figure 3:
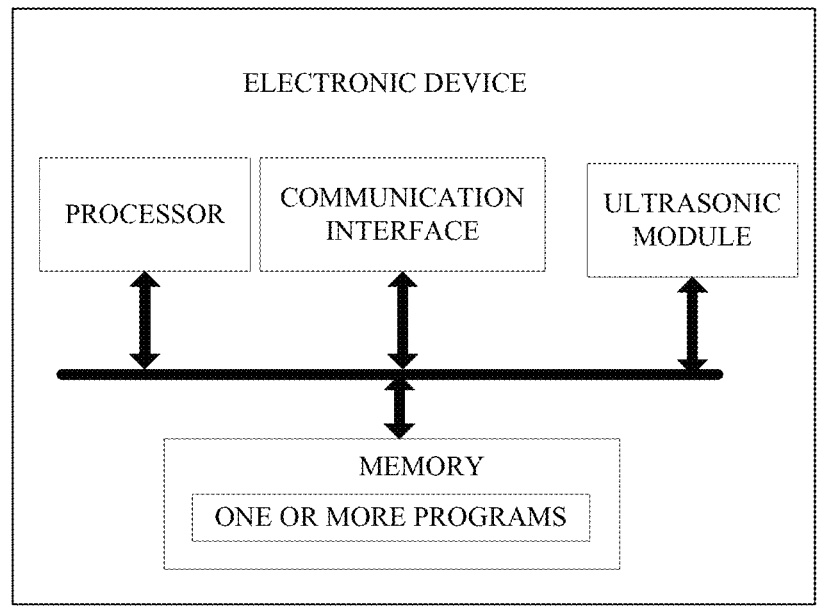
FIG. 3 is a schematic structural diagram illustrating an electronic device according to an embodiment of the present disclosure.

FIG. 3 is a schematic structural diagram illustrating an electronic device according to an embodiment of the present disclosure. As illustrated in FIG. 3, the electronic device may include an processor, a memory, a communication interface, an ultrasonic module, and one or more programs stored in the memory and configured to be executed by the processor. The one or more programs may include instructions for performing the following.

A first component set of the ultrasonic module may be controlled to operate at a first operating frequency to capture a 3D image of a target object, where the first component set includes P transmitters and Q receivers, and P and Q are positive integers. A second component set of the ultrasonic module may be woken up when the 3D image is identified to be a finger, where the second component set includes M transmitters and N receivers, M and N are positive integers, P<M, and Q<N. The second component set of the ultrasonic module may be controlled to collect fingerprints at a second operating frequency to obtain a target fingerprint image, where the first operating frequency is lower than the second operating frequency.

As can be seen, the electronic device of the present disclosure includes the ultrasonic module. The first component set of the ultrasonic module is controlled to operate at the first operating frequency to capture the 3D image of the target object, where the first component set includes P transmitters and Q receivers, and P and Q are positive integers. The second component set of the ultrasonic module is woken up when the 3D image is identified to be a finger, where the second component set includes M transmitters and N receivers, M and N are positive integers, P<M, and Q<N. The second component set of the ultrasonic module is controlled to collect fingerprints at the second operating frequency to obtain the target fingerprint image, where the first operating frequency is lower than the second operating frequency. In this way, the ultrasonic module only uses part of the components for proximity detection. When the ultrasonic module detects that the approaching target object is a finger, it uses more components for fingerprint collection. As such, the power consumption of the ultrasonic module can be reduced and the efficiency of fingerprint collection can be improved.

According to an embodiment of the present disclosure, the one or more programs may further include instructions for performing the following: controlling the ultrasonic module to enter a sleep mode when the target object is not detected.

According to an embodiment of the present disclosure, the one or more programs may include instructions for performing the following: detecting a distance between the target object and the electronic device through a proximity sensor; performing controlling the first component set of the ultrasonic module to operate at the first operating frequency when the distance is less than a predetermined distance.

According to an embodiment of the present disclosure, in terms of controlling the first component set of the ultrasonic module to operate at the first operating frequency, the one or more programs may include instructions for performing the following: controlling the first component set of the ultrasonic module to operate at the first operating frequency according to a predetermined period, where the predetermined period includes at least one first period of time and least one second period of time.

According to an embodiment of the present disclosure, the one or more programs may include instructions for performing the following: controlling, within any one of the at least one first period of time, the ultrasonic module to operate at a first transmission power and the first operating frequency, and controlling, within any one of the at least one second period of time, the ultrasonic module to operate at a second transmission power and the first operating frequency, where the first transmission power is less than the second transmission power.

According to an embodiment of the present disclosure, in terms of waking up the second component set of the ultrasonic module, the one or more programs may include instructions for performing the following: determining a proximity position of a finger; determining, according to a correspondence between positions and component sets, the second component set corresponding to the proximity position, and wake up the second component set.

The foregoing solution of the embodiments of the present disclosure is mainly described from the viewpoint of execution process of the method. It can be understood that, in order to implement the above functions, the electronic device includes hardware structures and/or software modules corresponding to the respective functions. Those skilled in the art should readily recognize that, in combination with the example units and scheme steps described in the embodiments disclosed herein, the present disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such embodiments should not be considered as beyond the scope of the present disclosure.

According to the embodiments of the present disclosure, functional units may be divided for the electronic device in accordance with the foregoing method examples. For example, each functional unit may be divided according to each function, and two or more functions may be integrated in one processing unit. The above-mentioned integrated unit can be implemented in the form of hardware or software functional units. It should be noted that the division of units in the implementations is schematic, and is merely a logical function division, and there may be other division manners in actual implementation.

Figure 4A:
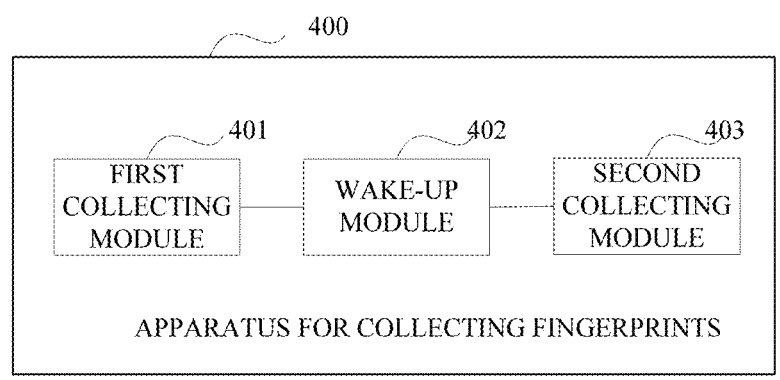
FIG. 4A is a block diagram illustrating an apparatus for collecting fingerprints according to an embodiment of the present disclosure.

FIG. 4A is a block diagram illustrating an apparatus for collecting fingerprints according to an embodiment of the present disclosure. The apparatus for collecting fingerprints 400 is applicable to an electronic device with an ultrasonic module. The apparatus for collecting fingerprints may include a first collecting module 401, a wake-up module 402, and a second collecting module 403.

The first collecting module 401 may be configured to control a first component set of the ultrasonic module to operate at a first operating frequency to capture a 3D image of a target object, where the first component set includes P transmitters and Q receivers, and P and Q are positive integers.

The wake-up module 402 may be configured to wake up a second component set of the ultrasonic module when the 3D image is identified to be a finger, where the second component set includes M transmitters and N receivers, M and N are positive integers, P<M, and Q<N.

The second collecting module 403 may be configured to control the second component set of the ultrasonic module to collect fingerprints at a second operating frequency to obtain a target fingerprint image, where the first operating frequency is lower than the second operating frequency.

As can be seen, the apparatus for collecting fingerprints according to embodiments of the present disclosure is applicable to an electronic device with an ultrasonic module. The first component set of the ultrasonic module is controlled to operate at the first operating frequency to capture the 3D image of the target object, where the first component set includes P transmitters and Q receivers, and P and Q are positive integers. When the 3D image is identified to be a finger, the second component set of the ultrasonic module is woken up where the second component set includes M transmitters and N receivers, M and N are positive integers, P<M, and Q<N. The second component set of the ultrasonic module is controlled to collect fingerprints at the second operating frequency to obtain the target fingerprint image, where the first operating frequency is lower than the second operating frequency. In this way, the ultrasonic module only uses part of components for proximity detection. When the ultrasonic module detects that the approaching target object is a finger, it uses more components for fingerprint collection. As such, the power consumption of the ultrasonic module can be reduced and the efficiency of fingerprint collection can be improved.

Figure 4B:
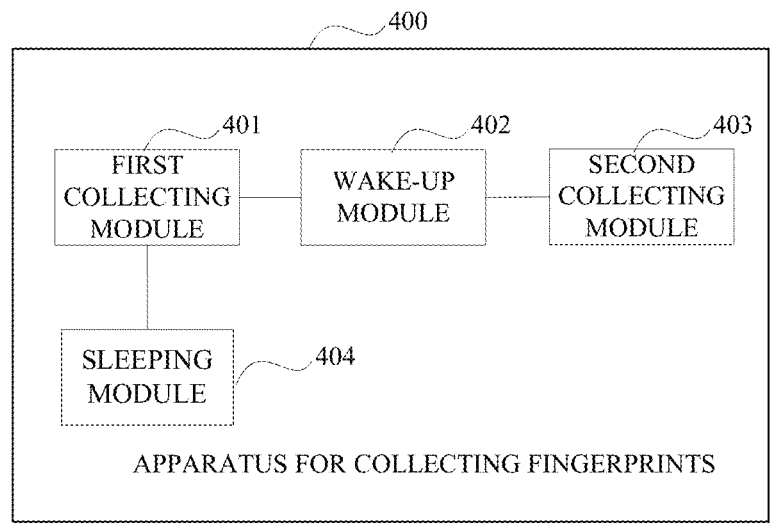
FIG. 4B is a block diagram illustrating an apparatus for collecting fingerprints according to another embodiment of the present disclosure.

According to an embodiment of the present disclosure, FIG. 4B illustrates another modified structure of the apparatus for collecting fingerprints as illustrated in FIG. 4A. Compared with the apparatus as illustrated in FIG. 4A, the apparatus in FIG. 4B may further include a sleeping module 404.

The sleeping module 404 may be configured to control the ultrasonic module to enter a sleep mode when the target object is not detected.

Figure 4C:
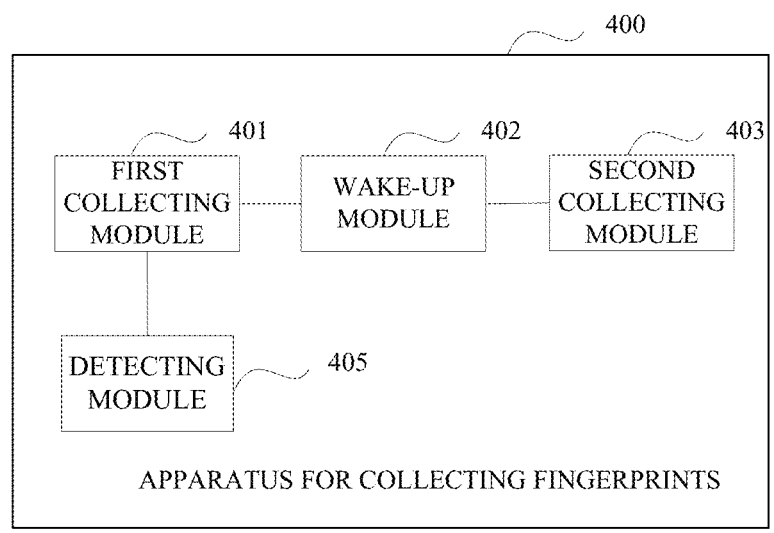
FIG. 4C is a block diagram illustrating an apparatus for collecting fingerprints according to another embodiment of the present disclosure.

According to an embodiment of the present disclosure, FIG. 4C illustrates another modified structure of the apparatus for collecting fingerprints as illustrated in FIG. 4A. Compared with the apparatus as illustrated in FIG. 4A, the apparatus in FIG. 4C may further include a detecting module 405.

The detecting module 405 may be configured to detect a distance between the target object and the electronic device though a proximity detector.

When the distance is less than a predetermined distance, the first collecting module 401 controls the first component set of the ultrasonic module to operate at the first operating frequency to capture the 3D image of the target object.

According to an embodiment of the present disclosure, the first collecting module 401 configured to control the first component set of the ultrasonic module to operate at the first operating frequency may be configured to control the first component set of the ultrasonic module to operate at the first operating frequency according to a predetermined period, where the predetermined period includes at least one first period of time and least one second period of time.

According to an embodiment of the present disclosure, the first collecting module 401 may be configured to control, within any one of the at least one first period of time, the ultrasonic module to operate at a first transmission power and the first operating frequency, and control, within any one of the at least one second period of time, the ultrasonic module to operate at a second transmission power and the second operating frequency, where the first transmission power is less than the second transmission power.

According to an embodiment of the present disclosure, the wake-up module 402 configured to wake up the second component set of the ultrasonic module may be configured to: determine a proximity position of a finger; determine, according to a correspondence between positions and component sets, the second component set corresponding to the proximity position, and wake up the second component set.

It can be understood that functions of program modules of the apparatus for collecting fingerprints in embodiments of the present disclosure can be specifically implemented according to the methods in the foregoing method embodiments, and for specific processes, reference can be made to related descriptions of the above method embodiments, which will not be repeated here.

Embodiments of the present disclosure may further provide a computer readable storage medium. The computer readable storage medium may be configured to store computer programs for electronic data interchange. The computer programs are operable with a computer to execute part of or all the operations of any of the methods for collecting fingerprints described in the above method implementations. The computer includes the electronic device.

Embodiments of the present disclosure may further provide a computer program product. The computer program product may include a non-transitory computer readable storage medium that stores computer programs. The computer programs are operable with a computer to execute part of or all the operations of any of the methods for collecting fingerprints described in the above method implementations. The computer programs can be a software installation package. The computer includes the electronic device.

It is to be noted that, for the sake of simplicity, the foregoing method embodiments are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the embodiments described in the specification are exemplary, and the actions and modules involved are not necessarily essential to the present disclosure.

In the foregoing embodiments, the description of each embodiment has its own emphasis. For the parts not described in detail in one embodiment, reference may be made to related descriptions in other embodiments.

In the embodiments of the present disclosure, it is to be understood that, the apparatus disclosed herein may be implemented in other manners. For example, the device/ apparatus described above are merely illustrative; for instance, the division of the unit is only a logical function division and there can be other manners of division during actual implementations, for example, multiple units or components may be combined or may be integrated into another system, or some features may be ignored or skipped. In addition, coupling or communication connection between each illustrated or discussed component may be direct coupling or communication connection, or may be indirect coupling or communication among devices or units via some interfaces, and may be electrical connection or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various embodiments of the present disclosure may be integrated into one processing unit, or each unit may be physically present, or two or more units may be integrated into one unit. The above-mentioned integrated unit can be implemented in the form of hardware or a software program module.

The integrated unit may be stored in a computer-readable memory when it is implemented in the form of a software program module and is sold or used as a separate product.

Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device, and so on) to perform all or part of the steps described in the various implementations of the present disclosure. The memory includes various medium capable of storing program codes, such as a universal serial bus (USB) flash disk, a read-only memory (ROM), a random-access memory (RAM), a removable hard disk, Disk, compact disc (CD), or the like.

It will be understood by those of ordinary skilled in the art that all or part of the operations of the various methods of the embodiments described above may be accomplished by means of a program to instruct associated hardware, the program may be stored in a computer-readable memory, which may include a flash memory, a ROM, a RAM, Disk or CD, and so on.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for collecting fingerprints with an electronic device having an ultrasonic module, the method comprising:
   controlling a first component set of the ultrasonic module to operate at a first operating frequency to capture a three-dimensional (3D) image of a target object, wherein the first component set comprises P transmitters and Q receivers, and P and Q are positive integers;
   waking up a second component set of the ultrasonic module when the 3D image is identified to be a finger, wherein the second component set comprises M transmitters and N receivers, M and N are positive integers, P<M, and Q<N; and
   controlling the second component set to collect fingerprints at a second operating frequency to obtain a target fingerprint image, wherein the first operating frequency is lower than the second operating frequency.

2. The method of claim 1, further comprising:
   controlling the ultrasonic module to enter a sleep mode when the target object is not detected.

3. The method of claim 1, further comprising:
   detecting a distance between the target object and the electronic device through a proximity detector; and
   wherein controlling the first component set of the ultrasonic module to operate at the first operating frequency comprises:
      controlling the first component set to operate at the first operating frequency when the distance is less than a predetermined distance.

4. The method of claim 1, wherein controlling the first component set of the ultrasonic module to operate at the first operating frequency comprises:
   controlling the first component set to operate at the first operating frequency according to a predetermined period, wherein the predetermined period comprises at least one first period of time and at least one second period of time;
   wherein controlling the first component set to operate at the first operating frequency according to the predetermined period comprises:
      controlling, within any one of the at least one first period of time, the ultrasonic module to operate at a first transmission power and the first operating frequency, and controlling, within any one of the at least one second period of time, the ultrasonic module to operate at a second transmission power and the first operating frequency, wherein the first transmission power is less than the second transmission power.

5. The method of claim 1, wherein waking up the second component set of the ultrasonic module comprises:
   determining a proximity position of the finger; and
   determining, according to a correspondence between positions and component sets, the second component set corresponding to the proximity position, and wake up the second component set.

6. The method of claim 1, wherein controlling the second component set of the ultrasonic module to collect fingerprints at the second operating frequency to obtain the target fingerprint image comprises:
   determining a proximity velocity at which the target object approaches the ultrasonic module and a current distance between the target object and the ultrasonic module;
   estimating fingerprint image acquisition time of the ultrasonic module according to the current distance and the proximity velocity; and
   collecting fingerprints through the second component set at the second operating frequency to obtain the target fingerprint image, when the fingerprint image acquisition time is reached.

7. The method of claim 6, further comprising:
   adjusting a fingerprint image acquisition parameter of the ultrasonic module according to the proximity velocity to obtain an adjusted fingerprint image acquisition parameter; and
   wherein collecting fingerprints through the second component set at the second operating frequency to obtain the target fingerprint image comprises:
      collecting fingerprints through the second component set at the second operating frequency with the adjusted fingerprint image acquisition parameter to obtain the target fingerprint image.

8. The method of claim 1, further comprising:
   matching the target fingerprint image with a preset fingerprint template; and
   performing an unlock operation when the target fingerprint image matches the preset fingerprint template.

9. The method of claim 8, wherein matching the target fingerprint image with the preset fingerprint template comprises:
   performing image segmentation on the target fingerprint image to obtain a target fingerprint area image;
   analyzing feature point distribution of the target fingerprint area image;
   performing circular image interception on the target fingerprint area image according to J different circle centers to obtain J circular fingerprint area images, wherein J is an integer greater than 3;
   selecting a target circular fingerprint area image from the J circular fingerprint area images, wherein the target circular fingerprint area image includes more feature points than other circular fingerprint area images in the J circular fingerprint area images;

dividing the target circular fingerprint area image into K rings, wherein the ring widths of the K rings are the same;

starting from the ring with the smallest radius among the K rings, matching feature points of the K rings with the preset fingerprint template in order and accumulating a matching value of matched rings; and stopping feature point matching immediately and outputting a prompt message indicating a successful identification, when the accumulated matching value is greater than a predetermined matching threshold.

10. An electronic device comprising:
at least one processor;
an ultrasonic module; and
a non-transitory computer readable storage, coupled to the at least one processor and storing at least one computer executable instruction thereon which, when executed by the at least one processor, causes the at least one processor to:
  control a first component set of the ultrasonic module to operate at a first operating frequency to capture a three-dimensional (3D) image of a target object, wherein the first component set comprises P transmitters and Q receivers, and P and Q are positive integers;
  wake up a second component set of the ultrasonic module when the 3D image is identified to be a finger, wherein the second component set comprises M transmitters and N receivers, M and N are positive integers, P<M, and Q<N; and
  control the second component set to collect fingerprints at a second operating frequency to obtain a target fingerprint image, wherein the first operating frequency is lower than the second operating frequency.

11. The electronic device of claim 10, wherein the at least one processor is further configured to control the ultrasonic module to enter a sleep mode when the target object is not detected.

12. The electronic device of claim 10, wherein the at least one processor is further configured to:
  detect a distance between the target object and the electronic device; and
  control the first component set to operate at the first operating frequency when the distance is less than a predetermined distance.

13. The electronic device of claim 10, wherein at least one processor configured to control the first component set of the ultrasonic module to operate at the first operating frequency is configured to:
  control the first component set to operate at the first operating frequency according to a predetermined period, the predetermined period comprises at least one first period of time and at least one second period of time, wherein:
    the at least one processor configured to control the first component set to operate at the first operating frequency according to the predetermined period is configured to control, within any one of the at least one first period of time, the ultrasonic module to operate at a first transmission power and the first operating frequency, and control, within any one of the at least one second period of time, the ultrasonic module to operate at a second transmission power and the second operating frequency, wherein the first transmission power is less than the second transmission power.

14. The electronic device of claim 10, wherein the at least one processor configured to wake up the second component set of the ultrasonic module is configured to:
  determine a proximity position of the finger; and
  determine, according to a correspondence between positions and component sets, the second component set corresponding to the proximity position, and wake up the second component set.

15. The electronic device of claim 10, wherein the at least one processor configured to control the second component set of the ultrasonic module to collect fingerprints at the second operating frequency to obtain the target fingerprint image is configured to:
  determine a proximity velocity at which the target object approaches the ultrasonic module and a current distance between the target object and the ultrasonic module;
  estimate fingerprint image acquisition time of the ultrasonic module according to the current distance and the proximity velocity; and
  collect fingerprints through the second component set at the second operating frequency to obtain the target fingerprint image, when the fingerprint image acquisition time is reached.

16. The electronic device of claim 15, wherein the at least one processor is further configured to:
  adjust a fingerprint image acquisition parameter of the ultrasonic module according to the proximity velocity to obtain an adjusted fingerprint image acquisition parameter; and
  the ultrasonic module configured to collect fingerprints through the second component set at the second operating frequency to obtain the target fingerprint image is configured to:
    collect fingerprints through the second component set at the second operating frequency with the adjusted fingerprint image acquisition parameter to obtain the target fingerprint image.

17. The electronic device of claim 10, wherein the at least one processor is further configured to:
  match the target fingerprint image with a preset fingerprint template; and
  perform an unlock operation when the target fingerprint image matches the preset fingerprint template.

18. The electronic device of claim 17, wherein the at least one processor configured to match the target fingerprint image with a preset fingerprint template is configured to:
  perform image segmentation on the target fingerprint image to obtain a target fingerprint area image;
  analyze feature point distribution of the target fingerprint area image;
  perform circular image interception on the target fingerprint area image according to J different circle centers to obtain J circular fingerprint area images, wherein J is an integer greater than 3;
  select a target circular fingerprint area image from the J circular fingerprint area images, wherein the target circular fingerprint area image includes more feature points than other circular fingerprint area images in the J circular fingerprint area images;
  divide the target circular fingerprint area image into K rings, wherein the ring widths of the K rings are the same;
  starting from the ring with the smallest radius among the K rings, match feature points of the K rings with the preset fingerprint template in order and accumulate a matching value of matched rings; and stop feature point matching immediately and output a prompt message indicating a successful identification, when the accumulated matching value is greater than a predetermined matching threshold.

19. A non-transitory computer readable storage medium storing a computer program which, when executed by a processor, causes the processor to:
control a first component set of an ultrasonic module to operate at a first operating frequency to capture a three-dimensional (3D) image of a target object, wherein the first component set comprises P transmitters and Q receivers, and P and Q are positive integers;
wake up a second component set of the ultrasonic module when the 3D image is identified to be a finger, wherein the second component set comprises M transmitters and N receivers, M and N are positive integers, P<M, and Q<N; and
control the second component set to collect fingerprints at a second operating frequency to obtain a target fingerprint image, wherein the first operating frequency is lower than the second operating frequency.

20. The non-transitory computer readable storage medium of claim 19, wherein the computer program executed by the processor to control the first component set of the ultrasonic module to operate at the first operating frequency is executed by the processor to:
control the first component set to operate at the first operating frequency according to a predetermined period, wherein the predetermined period comprises at least one first period of time and at least one second period of time;
wherein the computer program executed by the processor to control the first component set of the ultrasonic module to operate at the first operating frequency according to the predetermined period is executed by the processor to:
control, within any one of the at least one first period of time, the ultrasonic module to operate at a first transmission power and the first operating frequency, and control, within any one of the at least one second period of time, the ultrasonic module to operate at a second transmission power and the first operating frequency, wherein the first transmission power is less than the second transmission power.

* * * * *